April 28, 1953  R. C. LASSIAT ET AL  2,636,805
DISENGAGEMENT OF GASES FROM FLUENT SOLID PARTICLES
Filed Dec. 31, 1948  2 SHEETS—SHEET 1
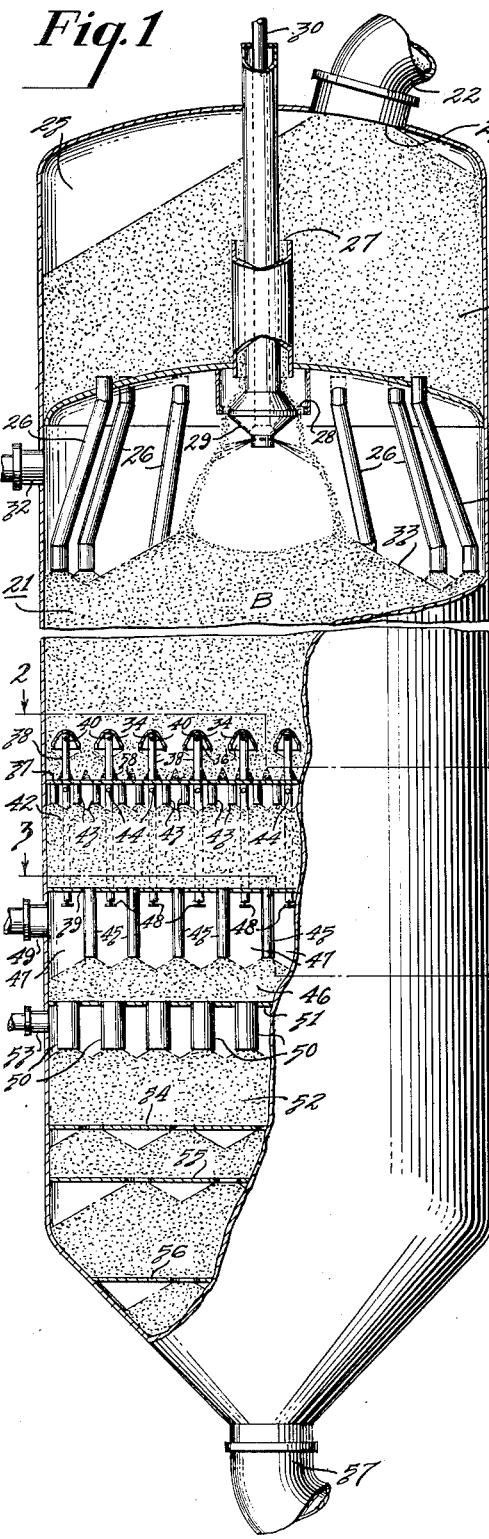
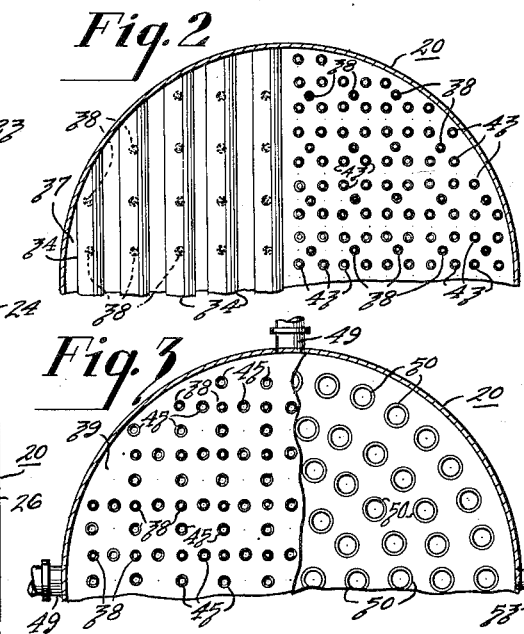
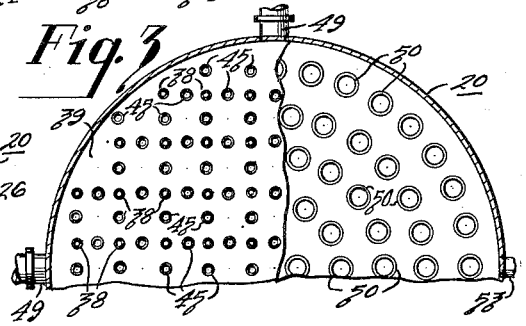
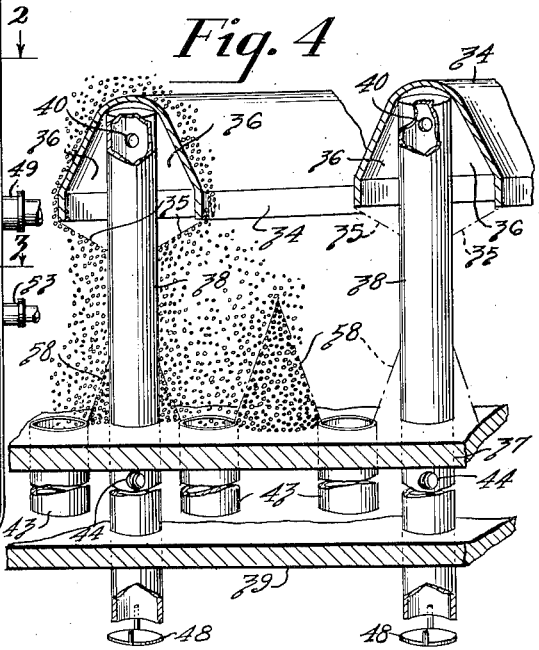
Inventors
Raymond C. Lassiat
& Robert M. Shirk
By Frank Wm Rose

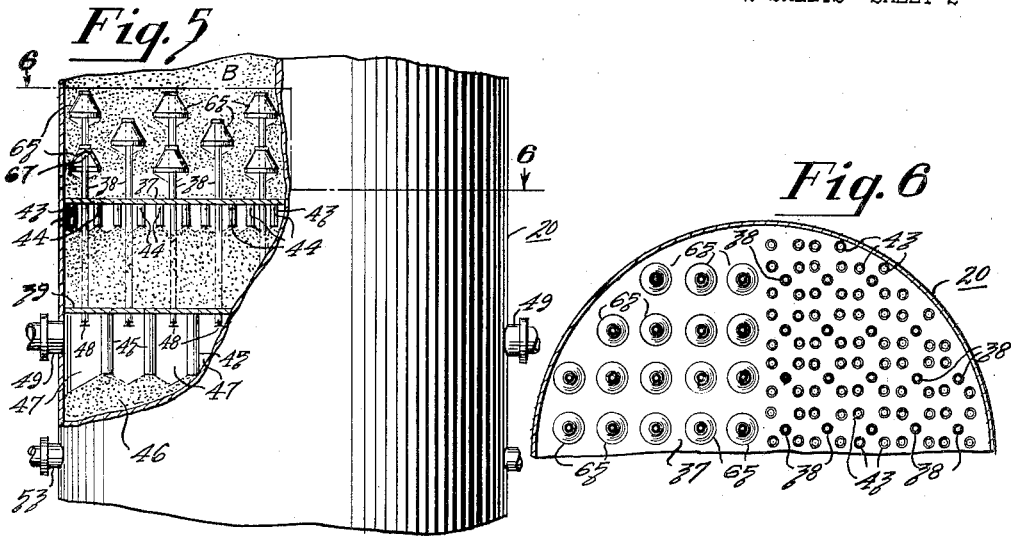

Patented Apr. 28, 1953

2,636,805

UNITED STATES PATENT OFFICE 2,636,805

DISENGAGEMENT OF GASES FROM FLUENT SOLID PARTICLES

Raymond C. Lassiat, Swarthmore, Pa., and Robert M. Shirk, Lindamere, Del., assignors to Houdry Process Corporation, Wilmington, Del., a corporation of Delaware Application December 31, 1948, Serial No. 68,662

6 Claims. (Cl. 23—1)

The use of moving bodies of fluent solid particles in processes that involve the contact of masses of such solid particles with fluids, as, for example, catalytic conversions of organic vapors by solid catalysts, has resulted in considerable advantages due to the continuous nature of the process but has also created problems arising from the inherent characteristics of such processes and of solid particles in such a fluent state. One such problem involving the disengagement of gas flowing concurrently through a downwardly moving bed of fluent solid particles in a contact zone may be overcome using methods and apparatus embodying the present invention.

The general technique for use of downwardly moving non-turbulent beds of fluent solid particles as contact masses is set forth in the technical literature (see, for its application to the catalytic cracking of hydrocarbons, an article entitled "The 'T. C. C.' Cracking Process for Motor Gasoline Production" by R. H. Newton, G. S. Dunham, and T. P. Simpson, "Transactions of the American Institute of Chemical Engineers," volume 41, page 215, April 25, 1945, and the articles there cited and for its application to the use of fluent inert particles for pyrolytic conversions, an article entitled "Thermofor Pyrolytic Cracking" by S. C. Eastwood and A. E. Potas, "Petroleum Processing," vol. 3, page 837, September 1948).

Recent investigations have shown that it is often desirable in such processes to flow the gas downwardly through the moving contact mass at high gaseous velocities. In many cases, these gaseous velocities attain a magnitude such that, if the gaseous flow were upward, the downward flow of solid particles would be disturbed to such an extent as to result in stoppage of the flow of solid particles and/or disruption of the bed with resulting turbulence, channelling of the gas and similar effects. These effects have been capably discussed in a recent patent (U. S. Patent No. 2,439,348, issued April 6, 1948, to T. P. Simpson, R. E. Lee, and F. E. Ray). The cited patent points out the advantages of multistage disengagement under conditions such that the disengaging surfaces provide a substantially greater area than the horizontal cross sectional area of the bed of solid particles in the contact zone. The present invention may be considered an improvement on the methods and apparatus described in the cited patent and, like the cited patent, is useful in connection with a wide variety of processes. However, the present invention will, for convenience and brevity, be described in terms of hydrocarbon conversion processes, particularly cracking; those skilled in the art will be able to apply the process and apparatus set forth herein to other fields and uses.

The present invention is a solution of the problem encountered at high gaseous velocities in systems of the type referred to herein. Because the disengagement of gas from the fluent particles involves the formation of free surfaces of the particles and a reversal of flow of the gas so as to pass upwardly through the free surfaces so formed, it is obvious that ordinary methods of disengagement would result in entraining excessive amounts of the particles in the disengaged gas.

The problem of high gaseous velocities becomes particularly important when hydrocarbon cracking systems are operated advantageously at high catalyst to oil ratios, such as four or more. It then becomes desirable and highly advantageous to employ concomitantly higher space velocities than have previously been customary in commercial moving bed systems for equal conversions. (The catalyst to oil ratio as used herein is the ratio of the weight rate of admission to the cracking zone of catalyst to that of the hydrocarbons; the space velocity is the volume rate of admission of hydrocarbons to the cracking zone, on a condensed basis (i. e., the volume of the hydrocarbons in a liquid state at 60° F. charged per hour) divided by the volume of catalyst instantaneously present in the cracking zone.) It clearly follows from the above definition that the higher the space velocity, the smaller the volume of catalyst present in the conversion zone. When space velocities above 1, such as from about 2 to 4 or more, are used, this effect must be considered in the design of reactor vessels.

If this small amount of catalyst is disposed in a deep bed of very small horizontal area, the pressure drop through such a bed is impractically high. If a relatively short, shallow bed of relatively large cross sectional area is employed, unequalities in the upper surface of the bed (or the profile) caused by feeding the solid particles as one or more columns of catalyst to the upper surface of the bed (see Figure 1) result in unequalities of considerable magnitude in space velocities through various sections of the bed with resulting inefficiencies and mechanical disturbances in operation. Indeed, care must be taken lest the amount of catalyst is only sufficient to fill the disengaging section. Moreover, shallow beds require that considerable precision in fixing the bed depth be exercised in order to obtain a desired space velocity and hence a desired conversion. The above considerations render broad beds of intermediate horizontal cross sectional area desirable. This shape of bed results in sufficiently high gas velocities through the bed as to cause the attendant difficulties that are discussed in the cited patent. It therefore often becomes necessary, in order to avoid entrainment of the solid particles in the disengaged gases, to employ a total disengaging surface substantially greater than the horizontal cross sectional area of the bed in the conversion zone.

As shown in the ctied patent, disengaging surfaces may be developed by a plurality of sets of multiple inverted troughs or sets of catalyst discharge conduits (a set of such conduits discharge catalyst to a bed below so as to form an upper free surface to the bed and thus form what is known as a plenum chamber), these sets being placed at a plurality of vertical levels. However, at high vapor flow rates in convertors of relatively small horizontal cross sectional area so many sets of inverted troughs must be used that disengagement starts at such a high level in the bed in the conversion zone that the total hydrocarbon vapors traverse only a small fraction of bed therein before some vapors are disengaged; more and more vapors being disengaged as the remainder of the vapors progress downwardly through the bed. However, it is obviously desirable from the standpoint of uniformity of conversion conditions to have as much of the vapors as possible contact all of the bed.

Similarly, when the vapors are disengaged by means of a plurality of vertical levels of plenums, a practical dilemma is encountered. Since the construction of the plenum is such the catalyst is discharged from the bed above the plenum through a plurality of conduits or nipples, the vapors pass through a total horizontal cross sectional area which is less than that of the bed and a considerable pressure drop may be encountered. If the catalyst discharge conduits are made short to decrease the pressure drop, difficulty is encountered due to the disturbance of the surface of the bed by cross flow of gas (i. e., flow normal to the flow of catalyst) as it is withdrawn to the exterior of the housing containing the bed; if the conduits are long, the pressure drop exceeds allowable values.

These and other difficulties are overcome in accordance with methods and apparatus embodying the present invention. As described herein, gas flowing concurrently through a downwardly moving non-turbulent bed of solid particles in a contact or conversion zone at gaseous velocities that, in upward flow, would cause stoppage or substantial disturbance of the downward flow of particles, is disengaged by gas disengaging means at a plurality of vertical levels, said levels being placed so that the total gas flowing downwardly traverses a major portion, such as at least half, of the bed in the contact zone prior to the disengagement of any gas and so that the lowermost level is below the end of the bed. A portion of the total gas flowing downwardly through the bed is disengaged above the end of the bed by devices arranged and shaped so that the remainder of the gas (the portion not disengaged) flows through the remainder of the bed in the contact zone at a pressure that is a substantial fraction, such as 75 to 90 percent, of the pressure at the top of the bed. The means for gas disengagement at the various vertical levels cooperate with gas eduction means so that the gas so disengaged flows downwardly as a plurality of confined streams and disengages or debouches into a gas manifolding zone therebelow; the confined streams of disengaged gas passing through and separate from solid particles in bed form below the level of disengagement. The confined streams are preferably arranged and spaced over the horizontal cross section of each vertical level of disengagement so as to provide short distances of travel of disengaged gas from the point at which it is disengaged to the nearest of such streams. The gas manifolding zone preferably is the plenum consisting of the space around and between confined downwardly directed columns of solid particles transferred from a bed above the gas manifolding zone to a bed therebelow, so that the latter bed forms the lower boundary of the gas manifolding zone or plenum. The confined columns of solid particles are arranged and disposed so as to have sufficient length so that cross flow of gas in the manifolding zone does not entrain solid particles from the surface of the bed therebelow. The disengaged gases flow laterally across the gas manifolding zone to at least one point of withdrawal from the apparatus and thence to other apparatus for appropriate processing or use thereafter.

The principles involved in the present invention are set forth in detail below in connection with the description of the drawings in which various embodiments of the present invention are shown. It is to be understood that these embodiments are to be regarded as illustrating this invention rather than restricting its scope. In the drawings:

Figure 1 is a vertical view of a vessel containing a moving bed of solid particles contacted by gases, with portions of the vessel broken away for a better view of the relationship of the parts, and illustrates a preferred embodiment of the invention;

Figures 2 and 3 are transverse sections of the vessel illustrated in Figure 1 taken along the lines 2—2 and 3—3, respectively, showing the relationship of the parts of the apparatus at these levels.

Figure 4 is an enlarged view of elements forming means of disengagement of gases in the vessel illustrated in Figure 1.

Figure 5 is a vertical view of a portion of a vessel illustrating another embodiment of the invention, with parts of the vessel broken away for a better view of the relationship of the parts.

Figure 6 is a transverse section of the vessel illustrated in Figure 5 along the lines 6—6, showing the relationship of the parts of the apparatus at this level.

Figure 7 is an enlarged view of a portion of the gas disengaging means employed in the vessel illustrated in Figure 5.

Figure 8 is a vertical view of a portion of a vessel illustrating yet another embodiment of the invention, with a portion of the vessel broken away for a better view of the relationship of the parts.

Shown in Figure 1 is a closed housing or vessel indicated generally at 20, which housing contains a contacting or cracking chamber or zone indicated generally at 21. Fluent solid particles in the size range of from about 50 mesh to about 0.5 inch and comprising solid hydrocarbon conversion catalyst, such as acid activated montmorillonite clay, synthetic silica-alumina gel in pellet or bead form or other solid refractory compositions known by those skilled in the art to be hydrocarbon cracking catalysts, are introduced to housing 20 by conduit 22 through an opening or port 23 in the top thereof and form a bed 24 in catalyst manifolding or introduction chamber 25 as shown. Particles in bed 24 flow from the storage chamber to the cracking or contacting chamber through conduits 26 (which are arranged equidistantly from the center of housing 20) and through annular passageways 27 and 28, the latter particles falling as a curtain past nozzle 29 through which nozzle a liquid hydrocarbon charge stock may be introduced by conduit 30 for atomization and contact with the particles in the falling curtain. If desired, hydrocarbons in vapor form may be introduced by conduit 32. The catalyst thus introduced forms a bed, B, in cracking chamber 21, the profile of which bed is roughly indicated by dotted line 33. The catalyst in bed B gravitates uniformly downward as a moving non-turbulent bed. Hydrocarbon vapors either introduced by conduit 32 or formed by contact of liquid hydrocarbon charge stock with hotter catalyst in the falling curtain of catalyst pass downwardly through bed B, flowing concurrently with the catalyst. As is well understood by the art, conditions are maintained in the cracking zone so that these hydrocarbon vapors are cracked.

Close to the bottom of the bed in the contacting or cracking zone and at least in the bottom half thereof, but spaced above the bottom as explained below, are disengaging means for disengaging only a portion of the vapors flowing concurrently downwardly through the bed. As shown in Figure 1, the disengaging means comprise a set of inverted upwardly tapered troughs or channels 34 which are regularly arranged and spaced apart over the horizontal area of the cracking chamber as may be seen by Figures 1 and 2. These troughs cause the particles of catalyst flowing downwardly to converge and flow through the spaces between the troughs and thus flow through only a portion of the horizontal cross sectional area of the bed and thereafter to diverge so that they flow through an area greater than said portion. As a result of the converging and diverging flow, the particles form primary gas disengaging surfaces 35 (Figure 4) which are a plurality of discontinuous surfaces inclined substantially at the angle of repose of said particles (as shown in Figure 4). Gas disengaging surfaces 35 together with troughs 34 create and define the boundaries of gas disengaging or collecting spaces 36, which spaces are free of solid particles and extend, as may be seen from Figure 2, laterally as narrow rectangles regularly arranged and spaced apart over the horizontal cross section of bed B. Troughs 34 are supported and spaced a short vertical distance above the bottom of contact chamber 21 as defined by chamber closure plate or tube sheet 37 (which is the approximate bottom of the cracking zone) by conduits 38 which extend downwardly to and through tube sheets 37 and 39 and which operate as a multiplicity of gas eduction means. Gas eduction conduits 38 are provided with orifices 40 sized so that a predetermined fraction or portion, generally less than a half, as for example, between 30 to 50 percent, of the total hydrocarbon vapors (including cracked products) passing through the bed at this level enter the conduits and flow downwardly therein.

Depending from and extending a relatively short distance below tube sheet 37 are a multiplicity of catalyst discharge conduits 43 through which flow the catalyst particles and the remainder of the hydrocarbon vapors not disengaged at the primary disengaging surfaces to an intermediate chamber placed immediately below the cracking chamber and extending from tube sheet 37 to tube sheet 39. The hydrocarbon vapors flowing through discharge conduits 43 disengage from the upper surface of the bed 42 formed by the particles discharged from conduits 43, the surface of the bed thus providing secondary disengaging surface. The vapors so disengaged enter ports 44 in gas eduction conduits 38, and mingle with the vapors disengaged at the primary disengaging surfaces, the total disengaged vapors thereafter flowing downwardly in the conduits. The particles discharged by means of nipples or conduits 43 form a second bed 42 of intermediate depth as described below and are discharged therefrom by a second multiplicity of catalyst discharge nipples or conduits 45 thereafter forming a third bed 46. (Conduits 45 immediately in front of conduits 38 have been omitted from Fig. 1 for sake of clarity.) As may be seen from drawings, gas eduction conduits 38 form a plurality of gas eduction means whereby a plurality of confined streams of disengaged gases flow downwardly through and separate from bed 42.

The space between and around conduits 45 and immediately below tube sheet 39 forms a gas manifolding zone, plenum or space 47, the lower boundary of which is the upper surface of bed 46 and the upper boundary of which is tube sheet 39. The total disengaged gases discharged from conduits 38 discharge or debouch into plenum 47 through the open lower ends of conduits 38, the direction of flow being changed by deflectors 48, and are withdrawn from the plenum through ports or openings 49 in the side of the housing 20, these ports being arranged regularly around the periphery of housing 20. The solid particles in the third bed 46 are discharged therefrom by a third set of catalyst discharge conduits 50 to form a fourth bed 52.

Steam for purging the catalyst of volatile hydrocarbons may be introduced by conduits 53, pass around and between conduits 50, enter the upper surface of bed 52, pass upwardly through discharge nipples or conduits 50 and bed 46, disengage from the upper surface of bed 46 and thereafter mingle with the total disengaged gases in gas manifolding plenum 47, with which gases the steam is withdrawn from the housing. The catalyst particles, after purging, are discharged from the apparatus by known catalyst withdrawal means, such as the plurality of orifice plates 54, 55 and 56 and conduit 57, as shown in Figure 1. (The construction and operation of devices of this character are described in U. S. Patent No. 2,412,136 issued on December 3, 1946, to L. P. Evans et al.) After withdrawal from housing 20, the catalyst, which has accumulated a deposit of coke owing to its contact with the hydrocarbons, may thereafter be regenerated and returned to conduit 22 at the top of housing 20 by methods and apparatus known to the art.

The first primary set of discharge conduits 43 may conveniently be square conduits regularly arranged and disposed over the horizontal cross sectional area of the bed instead of the round conduits shown in the drawings. A convenient method of obtaining such a regular distribution is to form tube sheet 37 from a plurality of castings, which are then supported by and rest on beams (not shown), which beams are joined, as by welding, to the walls of the housing and which extend downwardly into the second bed 42 to a level spaced above tube sheet 39, as explained below. When housing 20 is circular as shown in the drawings, the majority of the castings are square or rectangular, the castings around the periphery being shaped appropriately to conform to the shape of the housing. When the housing is square or rectangular, all of the castings may be square or rectangular. Conduits 43 may be advantageously square in horizontal cross section to effect a regular pattern of distribution of the particles when the streams of particles expand to form the upper surface of bed 42.

Conduits 43 are regularly arranged according to a square pattern, as shown in Figure 2 the distance between the edges being preferably small. A typical spacing is between about 3 to 6 inches, in a commercial size vessel of between 8 to 20 feet in diameter. Since the top of the body of static particles supported by the part of tube sheet not occupied by conduits (see dotted lines 58 in Figure 4) is preferably below the lowermost level of the disengaging surfaces created by the primary disengaging means (see dotted line 35 in Figure 4), a short height for the body of static particles is desirable in order to have the primary disengagement as close to the end of the chambers as possible. It is apparent that the preferred close spacing of conduits 43 produces a low height of static particles, thereby permitting the disengaging level to be close to tube sheet 37, and hence the end of bed B, so that as much of the bed as possible is traversed by the vapors before their disengagement. Under these conditions, inverted troughs 34 are placed a relatively short vertical distance, such as between about 6 to 20 inches and preferably about 10 inches above tube sheet 37 (the inverted troughs being generally about 4 to 8 inches high).

Conduits 43, which provide a plurality of discharge means adapted to discharge from the cracking chamber solid particles and concomitantly the remainder of the vapors (i. e., the vapors not disengaged above), extend downwardly a relatively short distance in order to minimize the gaseous pressure drop across the ends thereof. By providing sufficient total horizontal cross sectional area for these conduits, such as between about 40 and 80 percent of the horizontal cross sectional area of bed, and employing conduits of a length in the range of about 3 to 12 inches, such as about 5 to 8 inches, the gaseous pressure drop can be maintained in the range of about 0.4 to 1.5 pounds per square inch for between 50 to 70 percent of the total vapors passing through bed B.

The second bed 42 is of intermediate depth, since the considerations noted above in regard to the top of the body of static particles above tube sheet 37 also apply to the body of static particles above tube sheet 39 and allowance should be made for the interference of beams supporting tube sheet 37 with the flow of particles; a factor which tends to increase the depth of bed 42. Conduits 45 are spaced apart at somewhat greater distances than conduits 43 and generally are somewhat larger in diameter to provide for adequate flow of the particles.

The length of conduits 45 determines the height of the gas manifolding zone or plenum 47 and should be sufficient so that cross flow of vapors therein does not entrain solid particles frm the upper surface of bed 46. It should be noted that, since the vapor flow is toward points around the periphery of the plenum (i. e., the disengaged gases flow laterally across the zone to ports 49), the peripheral portions of the chamber must have an area normal to the gas flow adequate to handle a substantial fraction of the total disengaged vapors plus the gas resulting from purging, depending on the number of discharge ports. This effect is avoided in the plenum around conduits 43 where the plurality of points at which gases or vapors are collected results in short paths of travel from the point of disengagement to the nearest gas eduction conduit and hence the amount of cross flow is not additive. In Figure 2, the gases or vapors travel only from one of conduits 43 to one of gas eduction conduits 38 since a gas eduction conduit is at the center of each square pattern of conduits 43. However, other arrangements may be made, as where a gas eduction conduit is associated with five conduits 43. In general, gas manifolding plenum 47 operates satisfactorily when conduits 45 have a length of between about 1 to 4 feet, and preferably between about 18 to 30 inches.

An alternative arrangement is shown in Figures 5, 6 and 7 where inverted upwardly tapered cups or cones 65 are employed in place of inverted troughs 34. (Elements having the same members as elements in Figures 1, 2, 3 and 4 are similar thereto and have the same functions.) As shown in Figs. 5 and 7, the cups are staggered at different levels to provide close spacing without a disadvantageous diminution in the area available for the flow of catalyst and gases not yet disengaged. The inverted cups form, by their effect on the flow of catalyst, gas collection spaces 68 similar to gas collection spaces 36 formed by inverted troughs 34. Gas eduction conduits 38 are in throttled communication with gas collection spaces 68 through orifices. Where two inverted cups are associated with a single conduit the upper orifice 66 is smaller than the lower orifice 67. The embodiment shown in Figures 5, 6 and 7 has the advantage of a relatively low pressure drop across the portion of the bed in which disengagement takes place, while the embodiment previously described is preferred where it is desirable to traverse the maximum amount of bed B before any disengagement occurs.

As shown in Figure 8, a tube sheet 70 and catalyst discharge conduits 71, which cooperate to form a disengagement plenum or zone (as previously described) may be substituted for the inverted troughs, particularly where a slightly higher pressure drop is not objectionable. (Elements having the same numbers as elements in previous figures are similar thereto and have the same function.) However in this case, conduits 71 are of sufficiently large diameter (as compared, for example, to conduits 43) and sufficiently short that the pressure drop therethrough is practically negligible, such as less than about 0.5 pound per square inch, since all of the gas travelling downward must pass through these conduits. Since vapors not disengaged at the first disengaging level (and which enter gas eduction conduits 38 through orifices 40) pass through bed 72, the bottom of the contact zone is, as before, tube sheet 37. It is to be emphasized, however, that conduits 71 must be designed so that the conditions referred to in connection with the other embodiments (as to pressure drop and amounts of vapors disengaged) are met.

In all embodiments described above, the total disengaging surface (which is referred to as the area of the surfaces projected on a plane normal to the direction of overall particle flow) is considerably greater than the horizontal cross sectional area of the bed.

Obviously many modifications and variations of the invention as hereinbefore set forth may be made without departing from the spirit and scope thereof and therefore only such limitations should be imposed as are indicated in the appended claims.

We claim as our invention:

1. A method for disengaging gas flowing concurrently through a confined downwardly-moving compact bed of solid particles which comprises: obstructing the flow of said particles in a plurality of areas regularly disposed throughout a common level within the lower region of said bed to form a plurality of streams, said streams of particles expanding to reform as a bed below said level, thereby providing below the obstructed areas a plurality of internal particle-free gas-disengaging spaces having their lower boundary defined by internally exposed surfaces of said bed, passing said particles downwardly from the bottom of said bed successively through two confined zones, said particles flowing as a plurality of uniformly distributed confined streams a substantial distance into the upper region of each of said confined zones and as an expanded compact bed through the remaining portion thereof, the upper particle-free regions of said zones above said beds and surrounding said confined streams forming an upper gas disengaging plenum and a lower gas manifold plenum; disengaging a portion of said gas from said particles within said internal gas-disengaging spaces; disengaging the remainder of said gas from said particles at the surface of the bed defining the lower boundary of said upper plenum; passing said portion of disengaged gas downwardly from said spaces along a plurality of confined particle-free paths through the upper confined zone and into said gas manifold plenum; introducing the disengaged remainder of said gas from the upper region of said gas disengaging plenum into said confined particle-free paths for passage with said disengaged portion into said gas manifold plenum; and withdrawing all said disengaged gas at the side of said gas manifold plenum, said confined streams of particles passing into said gas disengaging plenum being such as to provide a relatively small pressure drop therethrough, and said gas manifold plenum being of sufficient vertical height to preclude entrainment of particles from the surface of the lowermost bed into the stream of disengaged gas flowing across said gas manifold plenum to the outlet at the side thereof.

2. A method for disengaging gas flowing concurrently through a confined downwardly moving compact bed of solid particles; which method comprises forming a primary disengaging zone immediately beneath the bottom of said bed by flowing said particles downwardly from the bottom of said bed as a first plurality of confined columns of sufficiently short length and of sufficient area that the pressure drop caused by the flow of the total of said gas therethrough is relatively negligible and thereafter expanding the flowing columns of particles to form a second shallow bed separated from the bed above by a plenum, the surface of said second bed constituting a primary disengaging surface; flowing said total gas through said first plurality of confined columns; disengaging only a portion of said total gases at said primary disengaging surface; discharging particles from the bottom of said second bed as a second plurality of confined relatively short columns of solid particle and expanding the flowing columns of particles to form a third bed separated from the bed above by a second plenum, the surface of said third bed constituting a secondary disengaging surface; discharging particles from said third bed as a plurality of confined relatively long columns of solid particles onto the surface of a fourth bed therebelow, the space around said relatively long column of particles and between the bottom of said third bed and the surface of said fourth bed constituting a gas manifold plenum, said manifold plenum being of sufficient height to preclude entrainment of particles from the surface of said fourth bed of solid particles forming the lower boundary of said gas manifold plenum, flowing gas disengaged at said primary disengaging surface downwardly as a plurality of confined particle-free streams to said gas manifold plenum, said confined streams of gas passing to said gas manifolding zone through said second and third beds; flowing the remainder of said gas through said second plurality of columns of particles; disengaging the remainder of said gas from said secondary disengaging surface; introducing the disengaged remainder of said gas to said confined particle-free streams of gas passing downwardly from said second plenum; discharging the combined streams of disengaged gas into said gas manifold plenum; and removing the total disengaged gas from the manifold plenum.

3. In apparatus for contacting gas with a bed of fluent solid particles in a contacting chamber, said apparatus comprising a closed housing with a horizontal baffle spaced intermediate the ends thereof, said baffle defining the bottom of said contacting chamber, means for introducing said particles to said housing and to said chamber, means for removing said particles from said housing, means for introducing gas to said housing and to said chamber for concurrent downward flow through said bed of particles; the combination thereof with a second horizontal baffle spaced apart from and below the first mentioned baffle, said first and second baffles defining the upper and lower boundaries of an intermediate chamber comprising a gas disengaging space located immediately below said contacting chamber and said second baffle defining the upper boundary of a lowermost chamber comprising a gas manifolding plenum located immediately below said intermediate chamber; a first plurality of solid particle discharge conduits communicating with said first horizontal baffle and extending vertically downwardly therefrom into said intermediate chamber to a common horizontal plane spaced above said second baffle; a second plurality of particle discharge conduits communicating with said second horizontal baffle and extending vertically downwardly therefrom into said lowermost chamber to a common horizontal plane said second plurality of particle discharge conduits being adapted and arranged to provide a gas manifold plenum immediately beneath said second horizontal baffle; at least one discharge port from said gas manifold plenum communicating with the exterior of said housing; a plurality of inverted upwardly tapered troughs regularly arranged and spaced apart over the horizontal area of said contacting chamber at relatively short vertical distances above said first baffle; a multiplicity of vertical imperforate gas eduction conduits extending below and supporting said troughs, at least one of said eduction conduits being associated with each of said troughs and communicating with the space immediately thereunder through an orifice and all of said gas eduction conduits extending through said first horizontal and said second horizontal baffles, and communicating with said gas manifold plenum; and ports in each of said gas eduction conduits substantially immediately below said first baffle to provide gaseous communication with said gas disengaging space.

4. In apparatus for contacting gas with a bed of fluent solid particles in a contacting chamber, said apparatus comprising a closed housing with a horizontal baffle spaced intermediate the ends thereof, said baffle defining the bottom of said contacting chamber, means for introducing said particles to said housing and to said chamber, means for removing said particles from said housing, means for introducing gas to said housing and to said chamber for concurrent downward flow through said bed of particles; the combination thereof with a second horizontal baffle spaced apart from and below the first mentioned baffle, said first and second baffles defining the upper and lower boundaries of an intermediate chamber comprising a gas disengaging space located immediately below said contacting chamber and said second baffle defining the upper boundary of a lowermost chamber comprising a gas manifolding plenum located immediately below said intermediate chamber; a first solid particle discharge means communicating with said first horizontal baffle and adapted to discharge confined streams of solid particles from said contacting chamber into said intermediate chamber at a horizontal plane spaced above said second baffle and concomitantly to discharge gas from said contacting chamber into said gas disengaging space at a low gaseous pressure drop across said discharge means whereby the particles so discharged form a continuous disengaging surface spaced below said first horizontal baffle; a second particle discharge means communicating with said second horizontal baffle and adapted to discharge solid particles onto the surface of a bed of particles in said lowermost chamber, said second discharge means being adapted and arranged to provide a gas manifold plenum between said second horizontal baffle and the surface of the bed therebelow; at least one discharge port from said gas manifold plenum communicating with the exterior of said housing; a plurality of gas disengaging means spaced at a relatively short vertical distance above said first baffle and regularly arranged and spaced apart over the horizontal area of said contacting chamber, each of said gas disengaging means being shaped so as to create a disengaging surface of solid particles and to provide a gas collection space above the disengaging surface associated therewith; a multiplicity of gas eduction means, at least one of said eduction means being in throttled communication with each of said gas collection spaces and all of said eduction means extending through said intermediate chamber to and communicating with said gas manifold plenum, said eduction means being arranged and spaced in respect to said disengaging means and said continuous disengaging surface as to provide short distances of travel of disengaged gas from the point at which it is disengaged to the nearest of said gas eduction means; and ports in each of said gas eduction means positioned immediately below said contacting chamber, said ports being in gaseous communication with said continuous gas disengaging space.

5. In apparatus for contacting gas with a bed of fluent solid particles in a contacting chamber, said apparatus comprising a closed housing with a horizontal baffle spaced intermediate the ends thereof, said baffle defining the bottom of said contacting chamber, means for introducing said particles to said housing and to said chamber, means for removing said particles from said housing, means for introducing gas to said housing and to said chamber for concurrent downward flow through said bed of particles; the combination thereof with a second horizontal baffle spaced apart from and below the first mentioned baffle, said first and second baffles defining the upper and lower boundaries of an intermediate chamber comprising a gas disengaging space located immediately below said contacting chamber and said second baffle defining the upper boundary of a lowermost chamber comprising a gas manifolding plenum located immediately below said intermediate chamber; a first plurality of solid particle discharge conduits communicating with said first horizontal baffle and extending vertically downwardly therefrom into said intermediate chamber to a common horizontal plane spaced above said second baffle; a second plurality of particle discharge conduits communicating with said second horizontle baffle and extending vertically downwardly therefrom into said lowermost chamber to a common horizontal plane, said second plurality of solid discharge conduits being adapted and arranged to provide a gas manifold plenum immediately beneath said second horizontal baffle; at least one discharge port from said gas manifold plenum communicating with the exterior of said housing; gas disengaging means spaced a relatively short vertical distance above said first baffle and comprising an uppermost horizontal baffle and short vertical particle discharge conduits depending downwardly therefrom to a common horizontal plane a short distance above said first baffle and regularly arranged and spaced over the horizontal extent of said uppermost baffle; a multiplicity of gas eduction means comprising a plurality of imperforate conduits in throttled communication with the space beneath said uppermost baffle and with the gas disengaging space below said first baffle, all of said gas eduction means extending downwardly below said uppermost baffle through said first horizontal and said second horizontal baffles and communicating with said gas manifold plenum.

6. In apparatus for contacting gas with a bed of fluent solid particles in a contacting chamber, said apparatus comprising a closed housing with a horizontal baffle spaced intermediate the ends thereof, said baffle defining the bottom of said contacting chamber, means for introducing said particles to said housing and to said chamber, means for removing said particles from said housing, means for introducing gas to said housing and to said chamber for concurrent downward flow through said bed of particles; the combination thereof with a second horizontal baffle spaced apart from and below the first mentioned baffle, said first and second baffles defining the upper and lower boundaries of an intermediate chamber comprising a gas disengaging space located immediately below said contacting chamber and said second baffle defining the upper boundary of a lowermost chamber comprising a gas manifolding plenum located immediately below said intermediate chamber; a first solid particle discharge means communicating with said first horizontal baffle and adapted to discharge confined streams of solid particles from said contacting chamber into said intermediate chamber at a horizontal plane spaced above said second baffle and concomitantly to discharge gas from said contacting chamber into said gas disengaging space at a low gaseous pressure drop across said discharge means; a second particle discharge means communicating with said second horizontal baffle and adapted to discharge solid particles onto the surface of a bed of particles in said lowermost chamber, said surface being spaced below said second horizontal baffle, said second discharge means being adapted and arranged to provide a gas manifold plenum between said second horizontal baffle and the surface of the bed therebelow; at least one discharge port from said gas manifold plenum communicating with the exterior of said housing; gas disengaging means spaced a relatively short vertical distance above said first baffle; a multiplicity of gas eduction means in throttled communication with said gas disengaging means and with said gas disengaging space, all of said gas eduction means extending through said first horizontal and said second horizontal baffles and communicating with said gas manifold plenum.

RAYMOND C. LASSIAT.
ROBERT M. SHIRK.

References Cited in the file of this patent

UNITED STATES PATENTS

| Number | Name | Date |
|---|---|---|
| 2,458,498 | Bergstrom | Jan. 11, 1949 |
| 2,458,499 | Bergstrom | Jan. 11, 1949 |
| 2,459,096 | Ray | Jan. 11, 1949 |